United States Patent
Sforzin

(10) Patent No.: US 12,461,820 B2
(45) Date of Patent: Nov. 4, 2025

(54) VARIABLE-LENGTH LOCKED-RAID FOR CXL DEVICES WITH COMPRESSION

(71) Applicant: Micron Technology, Inc., Boise, ID (US)

(72) Inventor: Marco Sforzin, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/647,070

(22) Filed: Apr. 26, 2024

(65) Prior Publication Data

US 2025/0335295 A1 Oct. 30, 2025

Related U.S. Application Data

(60) Provisional application No. 63/638,883, filed on Apr. 25, 2024.

(51) Int. Cl.
*G06F 11/10* (2006.01)

(52) U.S. Cl.
CPC ...... *G06F 11/1076* (2013.01); *G06F 11/1004* (2013.01)

(58) Field of Classification Search
CPC .......................... G06F 11/1076; G06F 11/1004
USPC ................................................ 714/6.24, 6.22
See application file for complete search history.

(56) References Cited

U.S. PATENT DOCUMENTS

| | | | |
|---|---|---|---|
| 2016/0004642 A1* | 1/2016 | Sugimoto | G06F 12/0864 711/128 |
| 2019/0212949 A1* | 7/2019 | Pletka | G06F 3/0619 |
| 2020/0034229 A1* | 1/2020 | Schneider | G06F 3/0689 |
| 2023/0083752 A1* | 3/2023 | Agarwala | G06F 3/0665 714/800 |
| 2024/0176489 A1* | 5/2024 | Alkalay | G06F 3/0647 |

FOREIGN PATENT DOCUMENTS

JP        2018014129 A  *  1/2018  .......... G06F 11/1096

* cited by examiner

*Primary Examiner* — Chae M Ko
(74) *Attorney, Agent, or Firm* — Wood IP, LLC; Theodore A. Wood

(57) ABSTRACT

In a locked RAID memory system, the present method generates variable-length compressed data in a RAID stripe, which is stored along with the inclusion of a single RAID parity segment (parity strip) for the entire stripe. If any one data segment (data strip) in the RAID stripe should fail, as determined by a CRC check, the data can be recovered by XORing the single RAID parity segment with all the non-errored data segments in the stripe. However, in order to determine which data segment has failed, successive data segments must be XORed, and the CRC check reperformed, until the CRC error stands corrected. In an embodiment, the successive data segments may be tested in parallel with suitable hardware. In an embodiment, the successive data segments may be tested sequentially, or semi-in-parallel and semi-sequentially.

19 Claims, 11 Drawing Sheets

VARIABLE-LENGTH LOCKED-RAID FOR CXL DEVICES WITH COMPRESSION

CROSS-REFERENCE TO RELATED APPLICATION

This application claims benefit to U.S. Provisional Patent Application No. 63/638,883, filed Apr. 25, 2024, the disclosure is incorporated herein by reference in its entirety.

FIELD OF TECHNOLOGY

The present disclosure relates to memory systems. The present disclosure further pertains to media of variable length locked redundant array of independent disks (VL LRAID).

BACKGROUND

Memory media (also referred to as "memory media devices") are widely used to store information in various electronic devices such as computers, user devices, wireless communication devices, cameras, digital displays, and the like. Information is stored by programing memory cells within a memory media device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory media device, a component may read, or sense, the state of one or more memory cells within the memory media device. To store information, a component may write, or program, one or more memory cells within the memory media device to corresponding states.

Various types of memory media devices exist, including magnetic hard disks, random access memory (RAM), read-only memory (ROM), dynamic RAM (DRAM), synchronous dynamic RAM (SDRAM), static RAM (SRAM), flash memory, and others. Memory media devices may be volatile or non-volatile. DRAM is organized as an array of storage cells with each cell storing a programmed value. SRAM memory may maintain its programmed states for the duration of the system being powered on. Non-volatile memory cells (e.g., not-AND (NAND) memory cells) may maintain their programmed states for extended periods even in the absence of an external power source.

Reliability, availability, and serviceability (RAS) are important considerations in many digital memory storage environments. The explosive growth of Internet content and the resulting data storage and computation requirements have resulted in the deployment of heterogeneous and sometimes complex data storage solutions in large-scale data centers, organizations, home computing environments, and even mobile computing environments. The increasing scale, intensity of use, criticality of applications etc. of such deployments bring their RAS capabilities into increasing focus.

A "redundant array of inexpensive disks" or "redundant array of independent disks" (RAID) is a data storage technology that combines multiple physical disk drives into one or more logical units for data redundancy, performance improvement, or both.

Data is distributed across the drives in one of several ways, referred to as RAID levels, which have varied levels of redundancy and performance. The different schemes, or data distribution layouts, are named by the word "RAID" followed by a number, for example, RAID 0, RAID 1, RAID 5, RAID 6, RAID 10, and others. Each RAID level provides a different balance among the key goals: reliability, availability, performance, and capacity.

RAID levels greater than RAID 0 protect unrecoverable sector read errors, as well as against failures of whole physical drives. For example, RAID 5 consists of block-level striping with distributed parity, which allows for the replacement and rebuilding of a damaged drive's data.

BRIEF DESCRIPTION OF THE DRAWINGS

Advantageous designs of embodiment of the present disclosure result from independent and dependent claims, the description, and the drawing. In the following, preferred examples of embodiments of the disclosure are explained in detail with the aid of the attached drawings. The drawings, which are incorporated herein and form part of the specification, illustrate the present disclosure. Together with the description the drawings further explain the principles of the disclosure, and to enable a person skilled in the relevant art(s) to make use of the disclosure.

DETAILED DESCRIPTION

Reliability, availability, and serviceability (RAS) are aspects of a system's design that affect its ability to operate continuously and to minimize the time necessary to service the system. Memory solutions in which multiple memory media devices (e.g., DRAM or other emerging memory die) are incorporated in, or are associated with, one memory device, such as, for example, a memory controller, are growing in scale and importance. With such growth, the effective and efficient implementation of RAS capabilities in such RAID memory solutions becomes increasingly important.

As discussed further below, RAID technology is characterized by vocabulary terms that include stripes and strips, where a stripe of memory may be composed of multiple strips of memory. However, the use of two such closely similar terms (strip, stripe), in the same sentences and phrases, can make for challenges in reading/comprehension.

Therefore, where the term strip is conventionally used concerning RAID, this document employs the term segment. That is, the term segment is synonymous with strip as the latter term is known in the art (except where noted otherwise herein). In particular, herein a stripe of RAID memory is composed of multiple segments of RAID memory.

In view of the above-described importance of RAS capabilities, improved solutions for providing such capabilities in RAID memory media device arrangements are needed. Embodiments of this disclosure are directed to such improved solutions. More specifically, the embodiments are directed to accessing a plurality of memory media devices (typically DRAM die) arranged as an RAID organization. The embodiments provide efficient error detection and correction, and thus RAS with reduced memory storage space requirements.

Figure 1:
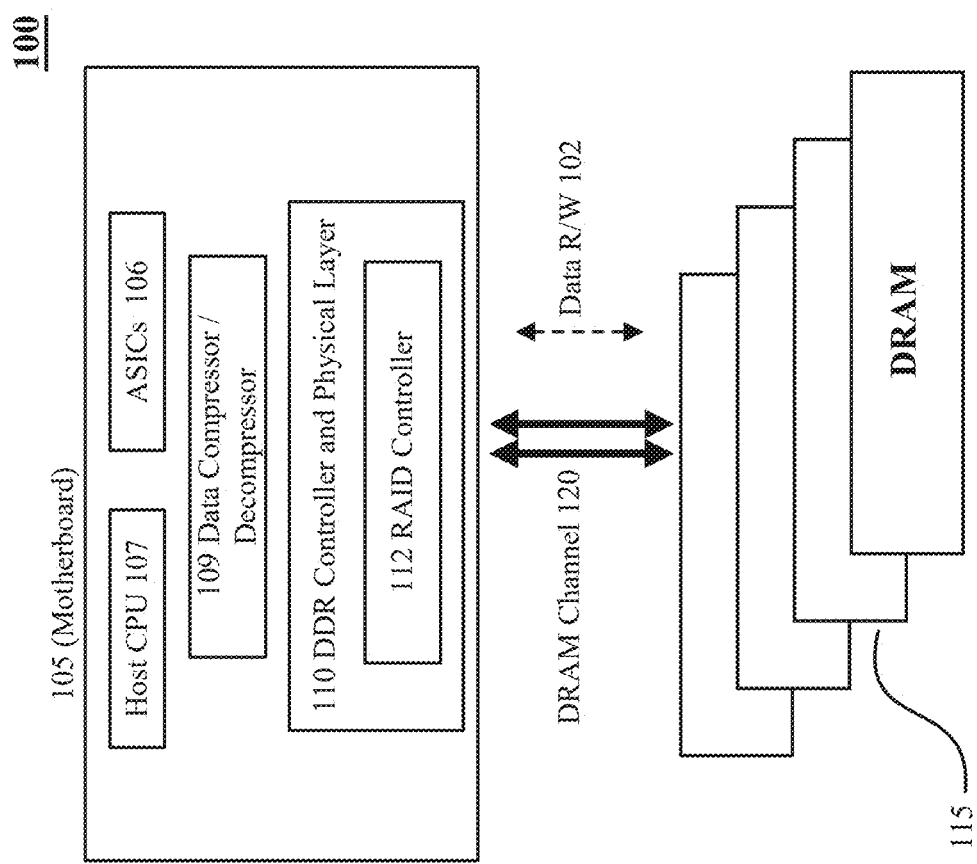
FIG. 1 illustrates a modular depiction of an exemplary legacy host computer system upon which embodiments of the present disclosure may be implemented.

FIG. 1 illustrates an exemplary host computer system 100. The computer system 100 includes a motherboard 105 having a host central processing unit (CPU) 107 and various application-specific integrated circuits (ASICs) 106 known in the art. The motherboard 105 may also include various data buses (including DRAM channel 120), physical communications ports, and expansion slots not shown in the figure.

The motherboard 105 may also include slots for insertion and communicative coupling of DRAM 115 storage. Data compressor/decompressor ASIC module data codec 109 provides for compression and decompression of data exchanged with the host CPU 107. In some embodiments, the data codec 109 may be implemented as software/firmware running on host CPU 107. In other embodiments, the data codec 109 may be implemented as software/firmware running on a host double data rate (DDR) Controller and Physical (Phy) Layer 110, discussed in detail below.

The DDR Phy layer 110 provides for direct data transmission of read/write (R/W) commands 102 between the DRAM 115 and the CPU 107. The direct data communications and the R/W commands 102 may occur over DRAM channel 120. The DDR Phy layer 110 may include a RAID controller 112 for storing data in the DRAM 115 according to RAID protocols. In the present disclosure, the RAID controller 112 may be configured to store and process the data according to VL LRAID protocols as discussed further herein.

Figure 2:
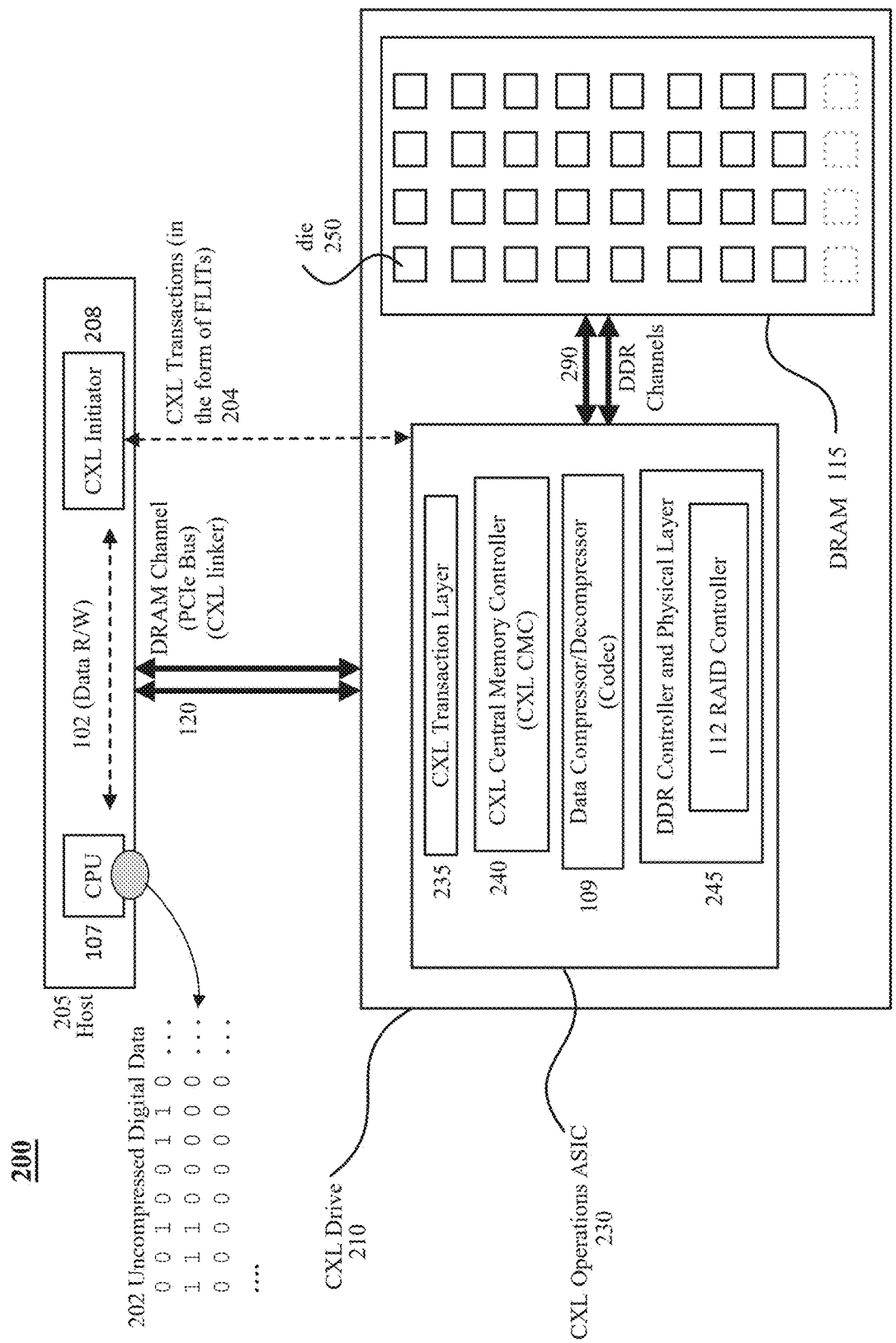
FIG. 2 illustrates a modular depiction of an exemplary host computer system which includes Compute Express Link (CXL) technology.

FIG. 2 illustrates an exemplary host computer system 200 that incorporates CXL technology. By way of background, the CXL is an open standard, cache-coherent interconnect for processors, memory, and memory expansion. CXL is defined by a series of commands and required memory command responses defined in a specification created by the Joint Electron Device Engineering Council (JEDEC) Solid State Technology Association and the CXL Consortium.

CXL technology maintains memory coherency between memory space, for example, of the CPU 107 and the DRAM 115 on attached devices. The motherboard 105 and the CPU 107 in combination may be referred to as simply the host device and may have memory in addition to the CXL ASIC. The host device 205 is a source of the data R/W commands that comprise the CXL transactions 204. A service mastering bus (not shown) may communicate control commands and CXL ASIC status to/from the host CPU 107 from/to CXL drive 210. The CXL drive 210 may include multiple ASICs mounted to a shared board or may be a single ASIC with multiple sub-modules. In general, the CXL drive 210 reads and writes data from/to the DRAM 115, or other suitable data storage, responsive to data requests from the host CPU 107 via CXL initiator 208.

The host device 205 of the host computer system 200 also may include an exemplary motherboard and various ASICs known in the art. The motherboard may again include various data buses or data interfaces, including DRAM channel 120. The DRAM channel 120 may be a Peripheral Connect Interface express bus (PCIe Bus), which may be referred to as a CXL linker. The host device 205 may also have physical ports and expansion slots not shown.

The motherboard may have mounted on board the CXL drive or have included slots (not shown) for the insertion of the CXL drive 210. The CXL drive 210 serves as mediator and controller between the CPU 107 and the DRAM 115. The DRAM channel 120 is used to digitally ferry the CXL transactions 204 between the host CPU 107 and the CXL drive 210. The motherboard may also include slots (not shown) for insertion and communicative coupling of the DRAM 115 shown elsewhere in the figure. In turn, the CXL drive 210 and the DRAM 115 are typically coupled via DDR channels 290, which may be integrated into the motherboard. In some embodiments, the CXL transactions 204 may include commands to control the RAID controller 112 according to the embodiments.

The CXL drive 210 may include an exemplary CXL operations ASIC 230, referred to in the appended claims as control circuitry 230. The CXL operations ASIC 230 may include a CXL transaction layer 235 providing data interfacing for CXL transactions 204, and thereby for data R/W commands 102, to/from the host CPU 107. In a conventional main memory, the CPU 107 makes transactions to the DRAM 115 through the DRAM channel 120. In the present disclosure, however, the CXL drive 210 will have one or more ASICs to intercept the CXL transactions 204, through the CXL drive 210, and convert them to DRAM transactions. One function of the CXL operations ASIC 230 in a CXL drive 210 is to convert R/W commands 102, made through the CXL transactions 204, to DRAM requests.

The CXL operations ASIC 230 may also include a CXL central controller (CXL CC) 240 and a DDR Phy layer 245. The motherboard 105 may be directly connected to CXL operations ASIC 230 via DRAM channel 120. The DDR Phy layer 245 may operate similarly to the DDR Phy layer 110 of the computer system 100 interfacing with the DRAM 115, as discussed above. The CXL operations ASIC 230 may also include the data codec 109. The CXL operations ASIC 230 may also include a RAID controller 112, which may in some embodiments be part of the DDR Controller and DDR Phy Layer 245.

Similarly, the CXL operations ASIC 230 may be directly connected to DRAM 115 via DDR channels 290. Specifically, the CXL CC 240 is communicatively coupled with the DRAM 115.

The CXL operations ASIC 230 may have logic blocks (shown as CXL CC 240) to perform additional tasks such as error correction, thermal management, media management, etc. In particular, the CXL CC 240 may include the data codec 109, and a RAS module (not shown).

In embodiments, the CXL drive 210 includes the DRAM 115 which has multiple die 250. Data may be stored in the die 250 according to LRAID protocols or VL LRAID, as discussed further below in this document.

Figure 3:
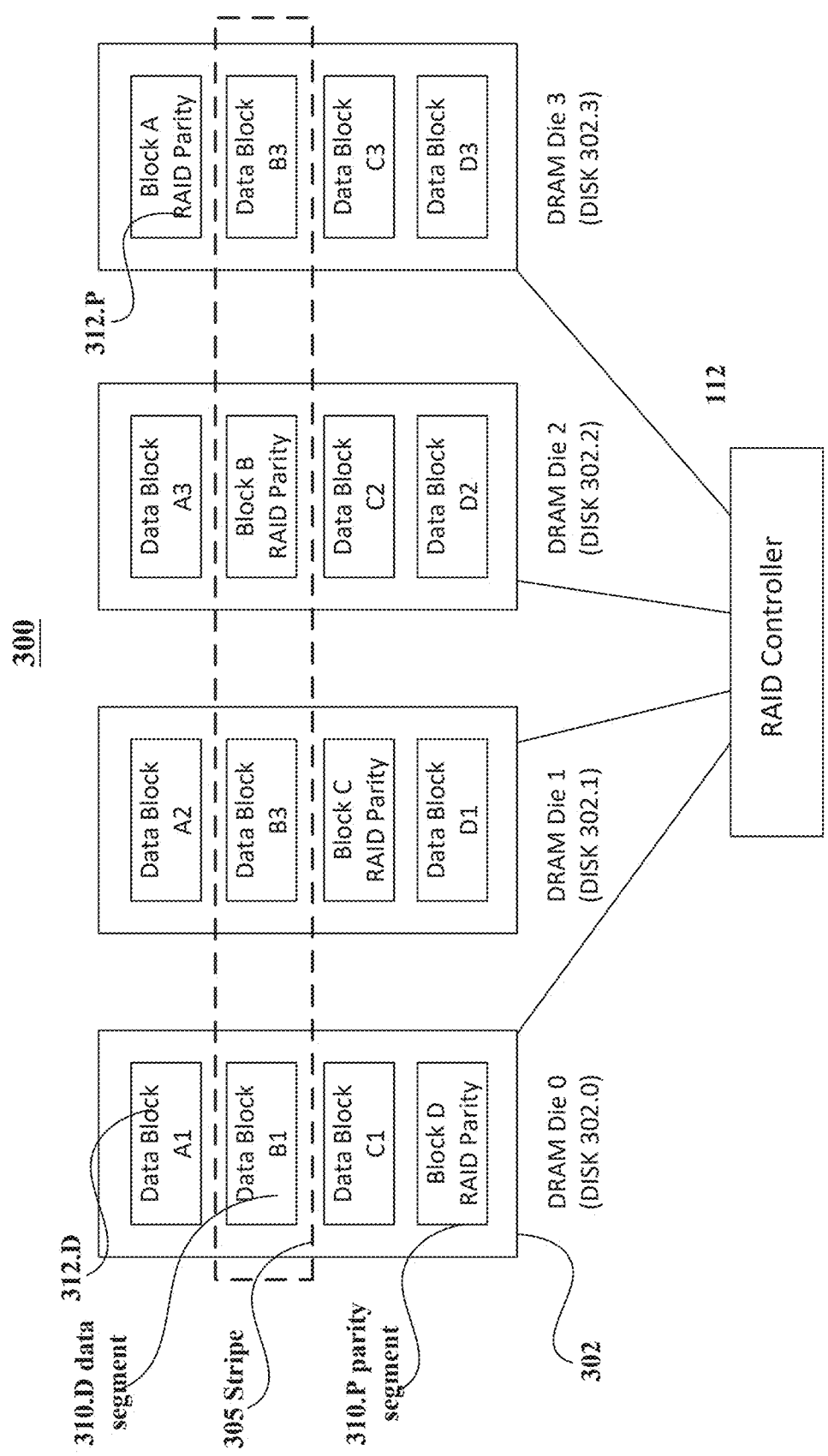
FIG. 3 graphically illustrates the storage of compressed user data and RAID parity in an LRAID8+1 array (with compression).

In some embodiments, the present system and method may be understood in part as a variation on RAID 5 storage technology. Therefore, and for context, FIG. 3 provides a block-level view of an exemplary RAID 5 storage configuration 300. RAID 5 is a particular RAID configuration that uses disk striping with parity. With disk striping, data is distributed across the storage in multiple units called stripes, with each stripe having multiple data segments. Data and parity are striped evenly across multiple disks 302. The data segments of each stripe have data redundancies, so if one segment is lost its data can be recovered from the other segments. Disk striping enables users to reconstruct data in case of a disk failure. RAID 5 groups have a minimum of three storage drives and no maximum. Because the parity is spread across all the disks 302, RAID 5 is considered one of the most secure RAID configurations.

Historically, the disk drives in a RAID data array have been hard drives. In the present system and method, hard drives are replaced by DRAM chips, also known as DRAM die 250. In FIG. 3, four DRAM die 250 function as disks 302.0, 302.1, 302.2, and 302.3. In typical configurations, there may be nine DRAM dies 250 which function as disks 302, for example, disks 302.0, 302.1, ... 302.8, with one die 250 being used for parity data.

In the embodiments, a single DRAM die 250 may be considered the chip-level analog of one hard disk drive. Each DRAM die 250 may be part of a dual inline memory module (DIMM) (not shown in the figure) with nine DRAM dies 250 equivalent to nine disks 302.

The benefits of RAID 5 primarily come from its combined use of disk striping and parity. Striping can also be viewed as the process of storing consecutive segments of parity and/or data across different storage blocks 310; it enables better throughput and performance.

Disk striping alone does not make an array fault-tolerant, however. Disk striping combined with RAID parity provides RAID 5 with redundancy and reliability.

Terminology: A DRAM die 250 stores data of all kinds in multiple chunks of data, each chunk having multiple bytes of data—for example, as few as 8 bytes of data, or 512 bytes of data, or 4 kilobytes of data—referred to as a storage block 312. The data may include data blocks 312.D with actual program data (numbers, text, program code, etc.), but may also include parity blocks 312.P with parity data. Parity data is data that is calculated from the program data in multiple data blocks 312.D, and encodes recovery information for the data in the multiple data blocks 312.D.

A segment 310 is a logical unit element of multiple bytes, which is part of a RAID stripe 305. In practice in some embodiments of a RAID array, a single segment 310 is often stored in a single block 312. Therefore, functionally, a given segment 310 is stored in a given block 312; and so a "RAID segment" 310 (logical unit) and a DRAM block 312 (physical unit of memory on the DRAM) become effectively one-and-the same-collection of bytes. There may be data segments 310.D and parity segments 310.P.

RAID 5 uses parity (instead of mirroring) for data redundancy. When data is written to a RAID 5 disk 302, the system calculates both a cyclic redundancy check (CRC) for each data block; and RAID parity for a series of data blocks. The CRC (not shown in the figure) is generally stored in the same data blocks 312.P with the data. The CRC parity is used for error detection. RAID parity is stored in separate blocks 312.P and is used for error recovery. In various embodiments, RAID parity 310.P may be calculated by any of the CPU 107, the data codec 109, the CXL CC 240, the DDR controller and the Phy layer 110, and/or the RAID controller 112. The RAID parity 310.P is calculated as a bit-wise exclusive-OR (XOR) of all the data contained in the eight data segments 310.D.

While mirroring (RAID 1) maintains multiple copies of data in each volume to use in case of failure, RAID 5 can rebuild a failed drive using the parity which is not kept on a fixed single die 250 (which again function as disks 302).

By keeping program data distributed across multiple DRAM dies 250, plus the RAID parity data, any n−1 die 250 of n dies 250 (for example, any eight of nine dies) can combine to equal the data stored on a failed $n^{th}$ die, keeping data secure in case of a single die failure.

Drives can be hot-swapped in RAID 5, which is a routine feature of RAID 5 with hard drives. In some embodiments of the present system and method, the DRAM dies 302 which constitute the "disk drives" may be pluggable and unpluggable from chip sockets of circuit boards (such as a suitably configured dual inline memory module (DIMM)), in which case a failed DRAM die 205 can be removed and replaced without downtime.

In the exemplary RAID 5 storage configuration 300 of FIG. 3, one of the disks 302.n may physically be constituted by a single DRAM die 250. Together, the separate disks 302 form a virtual drive (not labelled) that contains the full data storage. This virtual drive is presented to the rest of the computer system 100, 200 by the RAID controller 112.

In summary: Blocks 312 are the physical units of storage on the DRAM, and are a series of bytes (for example, 64 bytes). Segments 310 (310.D for data or 310.P for RAID parity) are logical units of data or parity storage. However, in some embodiments of the present system and method, "blocks" and "segments" are substantially equivalent, in that one block 312 will store either one data segment 310.D or one parity segment 310.RP.

Each disk in the array may store multiple segments 310 which may be either data segments 310.D or parity segments 310.RP. The parity segments 310.P are used to store RAID parity which enables the reconstruction of the parity in one of the disks 302.m if another one of the disks 302.n fails. Multiple blocks (e.g., data blocks 312.D or parity blocks 312.P) are stored across multiple dies 250 (effectively disks, 302) to form a RAID stripe 305 (i.e., related information stored evenly across multiple disks).

LRAID is similar to RAID 5. The main differences between the two are the following: Locked refers to the fact that an entire RAID stripe is accessed during a single read/write operation. In this way, after the read/writer access, the RAID controller 112 has all the information to recover the failed segment without additional accesses to the medium. In LRAID, the data correction process does not need to access the drive medium repeatedly because in LRAID the entire RAID stripe is uploaded into the RAID controller 112 during each single read/write operation. (By contrast, in a legacy RAID5 mechanism applied to DRAM, once an error is detected in a stripe 305 after a read or write operation, the RAID controller 112 accesses the disk media again to upload the stripe 305.)

LRAID needs fundamentally only one CRC per stripe 305 to detect errors. Instead, legacy RAID 5 needs one CRC per segment 310, i.e., for each block 312 of the stripe 305. For this reason the position of the error in the LRAID system is unknown and a multi-tentative decoding method 832 is needed as explained further below. In each tentative decode pass, the multi-tentative decoding method 832 supposes that the error is in a specific block 312. Only the tentative decode that correctly decodes the position is really affected by error.

In a LRAID 8+1 for CXL application, at each memory access the method activates nine DRAM dies 250 (nine "disks" 302): eight dies 250 provide the data (and the CRC parity), while the ninth die 250 provides the RAID parity. Each DRAM die 250 provides 64 bits of data, so that eight chips provide the 64 bytes required by the CXL Host (64 bytes is the granularity of the data packet in CXL). The stripe 305 is composed of nine segments 310.D/310.P (fewer are depicted in FIG. 3): eight data segments 310.D plus one parity segment 310.P. If one of the segments 310.D/310.P is affected by error, its data can be recovered by XOR-ing all the remaining segments 310.D/310.P in the stripe 305. In LRAID, the RAID controller 112 already has this information in its buffer after the read/write access. In conventional RAID5 instead, the remaining 7 data segments and the parity segment must be uploaded in the controller by re-accessing the storage medium.

The CRC parity (and other information like error correction code (ECC) parity and Metadata) are contained in the additional bits.

Figure 4:
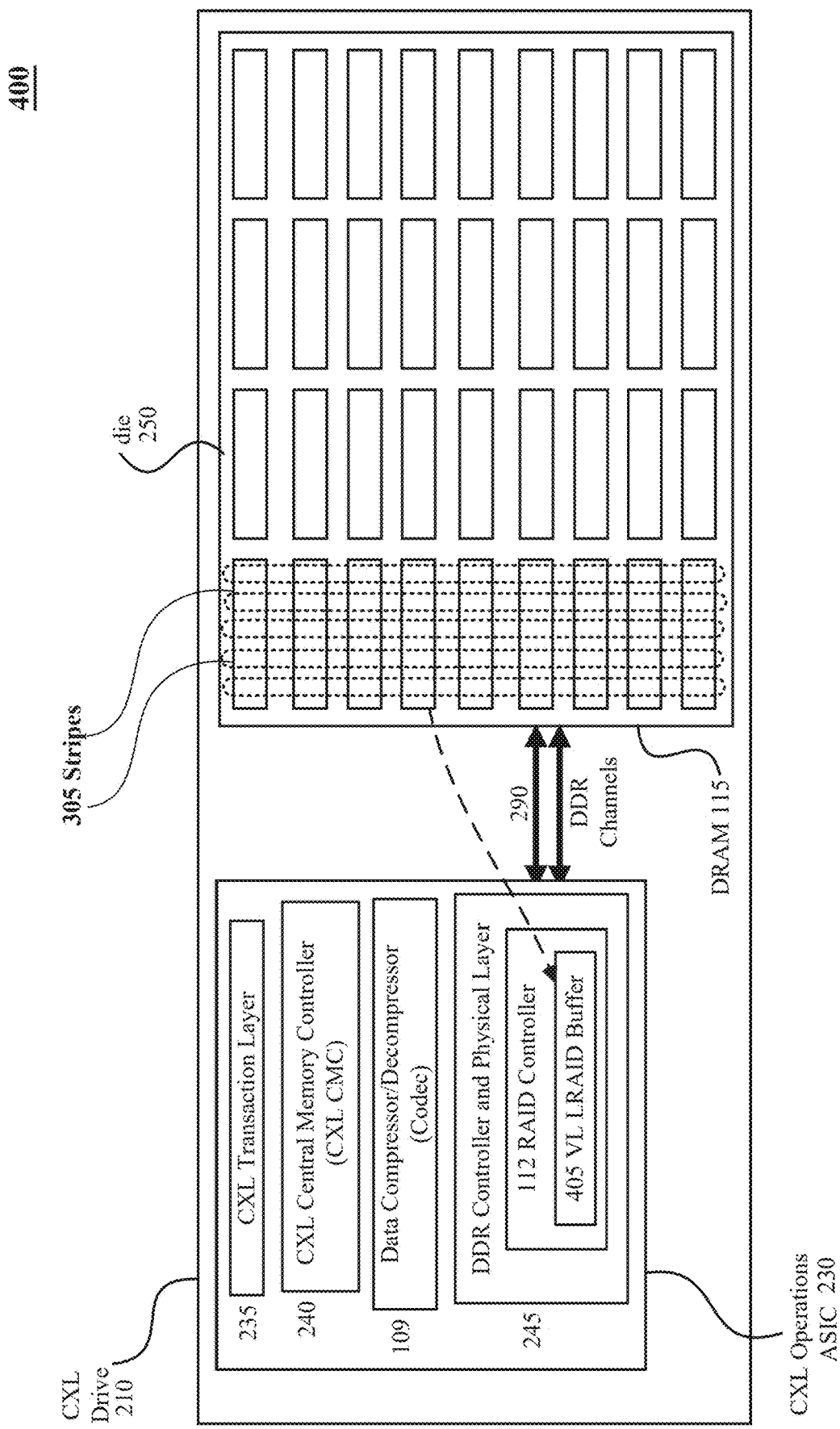
FIG. 4 illustrates elements of an exemplary LRAID system.

FIG. 4 illustrates elements of an exemplary LRAID system 400. As shown, the system 400 may employ a VL LRAID buffer 405 that can store and process an entire stripe (such as the stripe 305) according to the embodiments. The buffer 405 may, for example, be part of the RAID controller 112.

LRAID fundamentally needs only one CRC per stripe to detect errors. Instead, legacy RAID needs one CRC per segment, i.e., one CRC for each element of the stripe. For this reason, the position of the error within the LRAID system is unknown and a multi-tentative decoding process 832 is needed as described further below (see FIG. 8B). In each pass of the tentative decode (or in each instance, if the tentative decode is done in parallel on multiple dies 250), the assumption may be made that the error is located in a specific data segment 310.D.

Figure 5A:
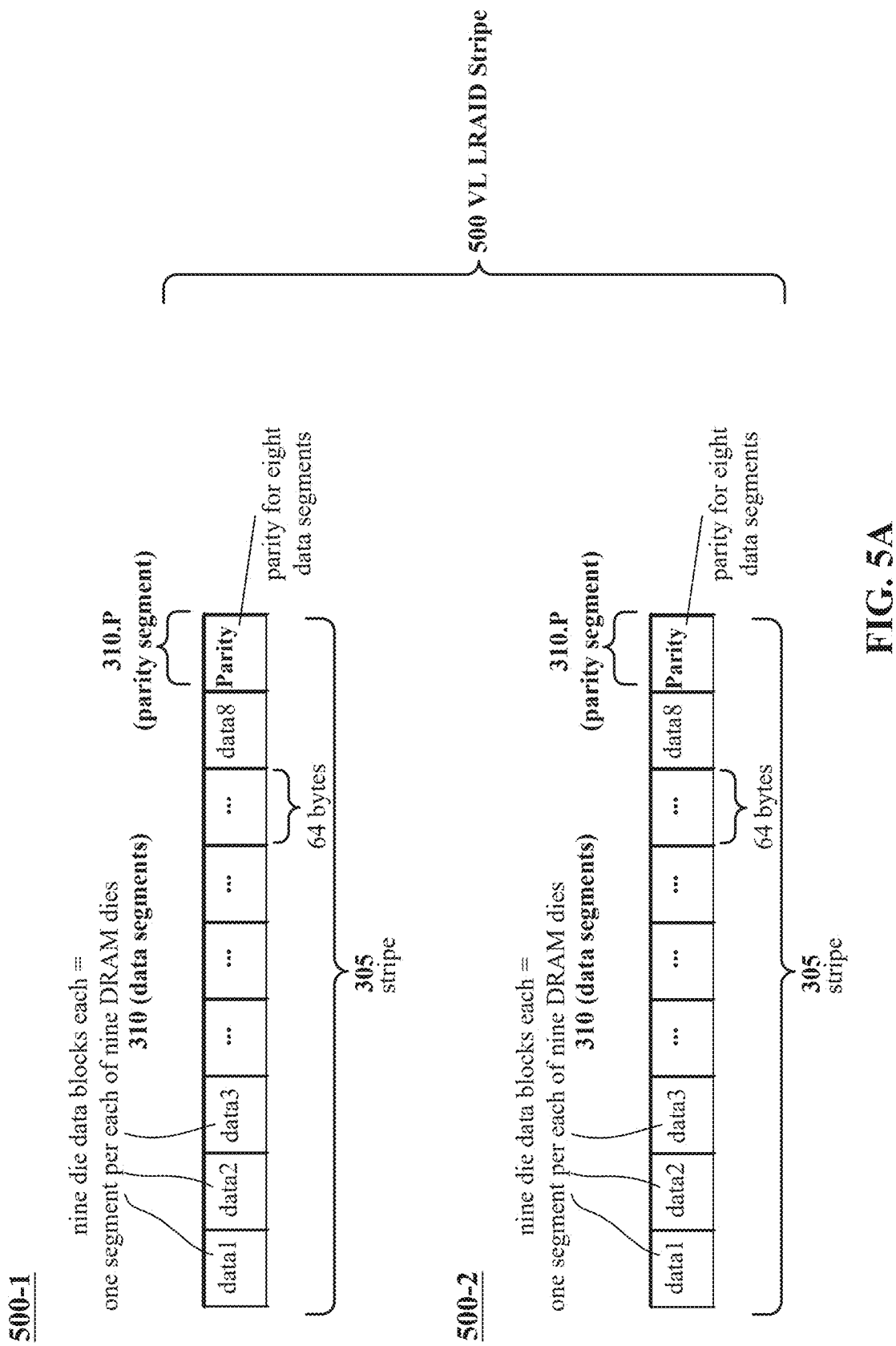
FIG. 5A illustrates the storage of data with parity according to LRAID.

FIG. 5A illustrates an exemplary two stripes 305 (500-1, 500-2) which can be logically combined to form one exemplary, combined VL LRAID stripe 500 for storage. Stripes 500-0 and 500-1 each have nine data/parity segments 310. As used herein, a VL LRAID stripe 500 is the amount of information accessed from a single die 250 at a time, in this example, 512 bytes. Each stripe 500-0 and 500-1 requires one LRAID parity segment 310.P. Thus, in total (in this example), two LRAID parity segments 310.P are required for storage of parity information. Storage of parity information within the RAID VL LRAID stripe 500 occurs according to legacy RAID protocols.

Figure 5B:
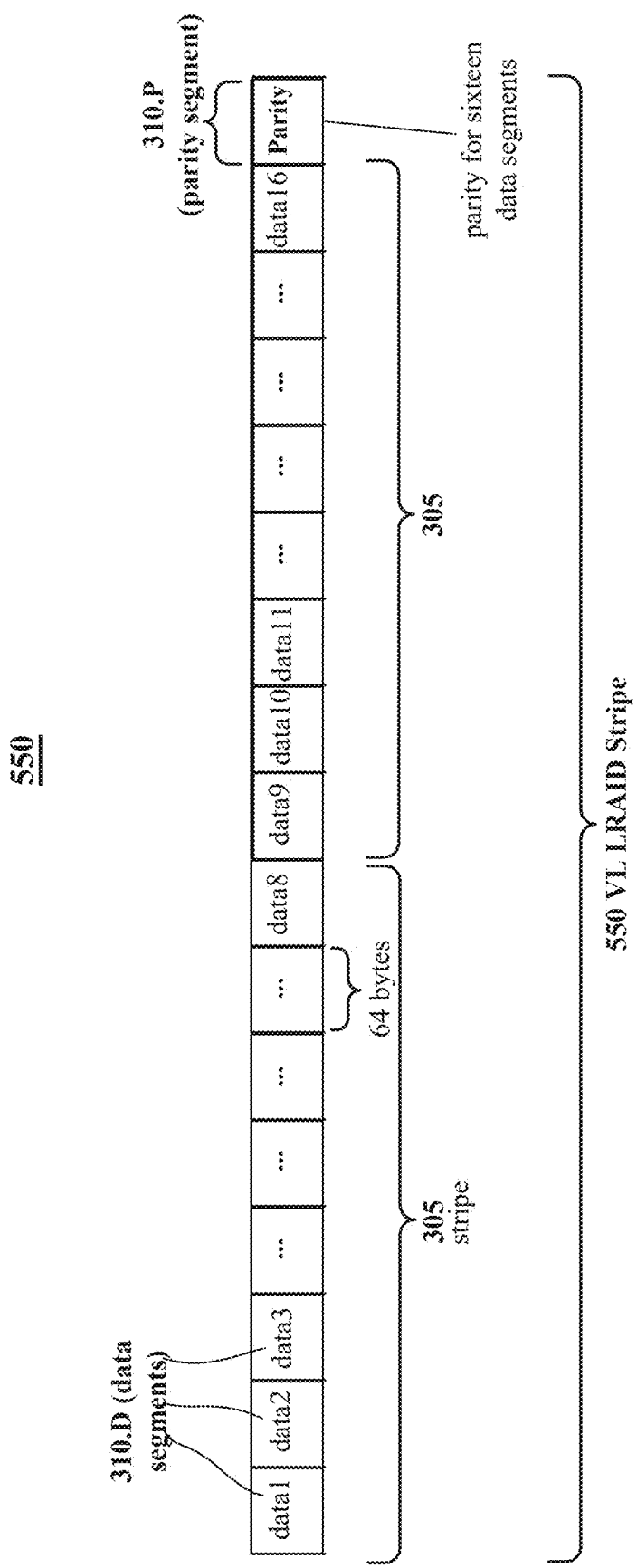
FIG. 5B illustrates the storage of data with parity according to an embodiment of variable length LRAID.

FIG. 5B illustrates a VL LRAID stripe 550 comprised of a single series of segments 310 having sixteen data segments 310.D. The VL LRAID stripe 550 also contains one parity block 310.P. In the embodiments, storage of information within the VL LRAID stripe 550 occurs in accordance with VL Locked RAID protocols. Note that sixteen data blocks is exemplary only, and the exact number of data blocks will vary depending on total length of the VL LRAID stripe 550. Accordingly, in FIG. 5B memory space is saved through the use of one parity block 310.P in place of two (or more) RAID parity blocks 310.P. In practical application, this reduces the number of DRAM dies by at least one by eliminating the need for one die for parity.

In some embodiments, the single parity segment 310.P may include a fixed number of bits for each data segment 310.D in the VL LRAID stripe 550. For example, in an embodiment, each of the user data segments 310.D and the RAID parity segment 310.P in the same stripe 550 are the same fixed size, and the parity is calculated as a bitwise XOR of all the user data blocks 310.D in the stripe.

Although the present example scenario above applies to VL LRAID 2*8+1, the process can be used to detect and optionally correct data errors in VL LRAID configurations of various sizes LRAID n*8+1, where 'n' is an integer ranging from two or more. Other exemplary embodiments use a LRAID n*16+1 configuration.

In embodiments discussed further below, data compression can be used in each of these configurations for reducing the overhead of the VL LRAID system by eliminating the need for additional dies 250 for storing parity 310.P.

In conventional systems, each data block 312 (equivalently a RAID segment 310) has its own RAID parity (typically 64 bytes) and CRC parity (typically 4 bytes). In this way, each data block can be individually checked for errors (with a CRC check) and if an error is found, it can be corrected with the RAID parity byte(s) that are specifically dedicated to the errored data block. However, this requires at least one RAID parity sector for each data block.

As is known in the art, a CRC check may detect an error in a data block 312.D, which is the equivalent of a data segment 310.D. The CRC will detect whether the data segment 310.D has the error. By way of error recovery, the remaining (non-errored) data segments 310.D may be XORed with the parity segment 310.P to recover the errored data segment 310.D.

In the embodiments, one RAID parity segment 310.P is calculated for a sequential set of locked data segments 310.D, such as eight data blocks 312.D or sixteen data blocks 312.D, or fewer data blocks 312.D if data compression is employed. In this way, fewer parity bytes are required for error correction and storage space is thereby saved. Since the parity segments 310.P collectively require their own DRAM die 250, reducing the number of parity segments 310.P effectively reduces the number of DRAM die 250, resulting in cost savings.

Figure 6A:
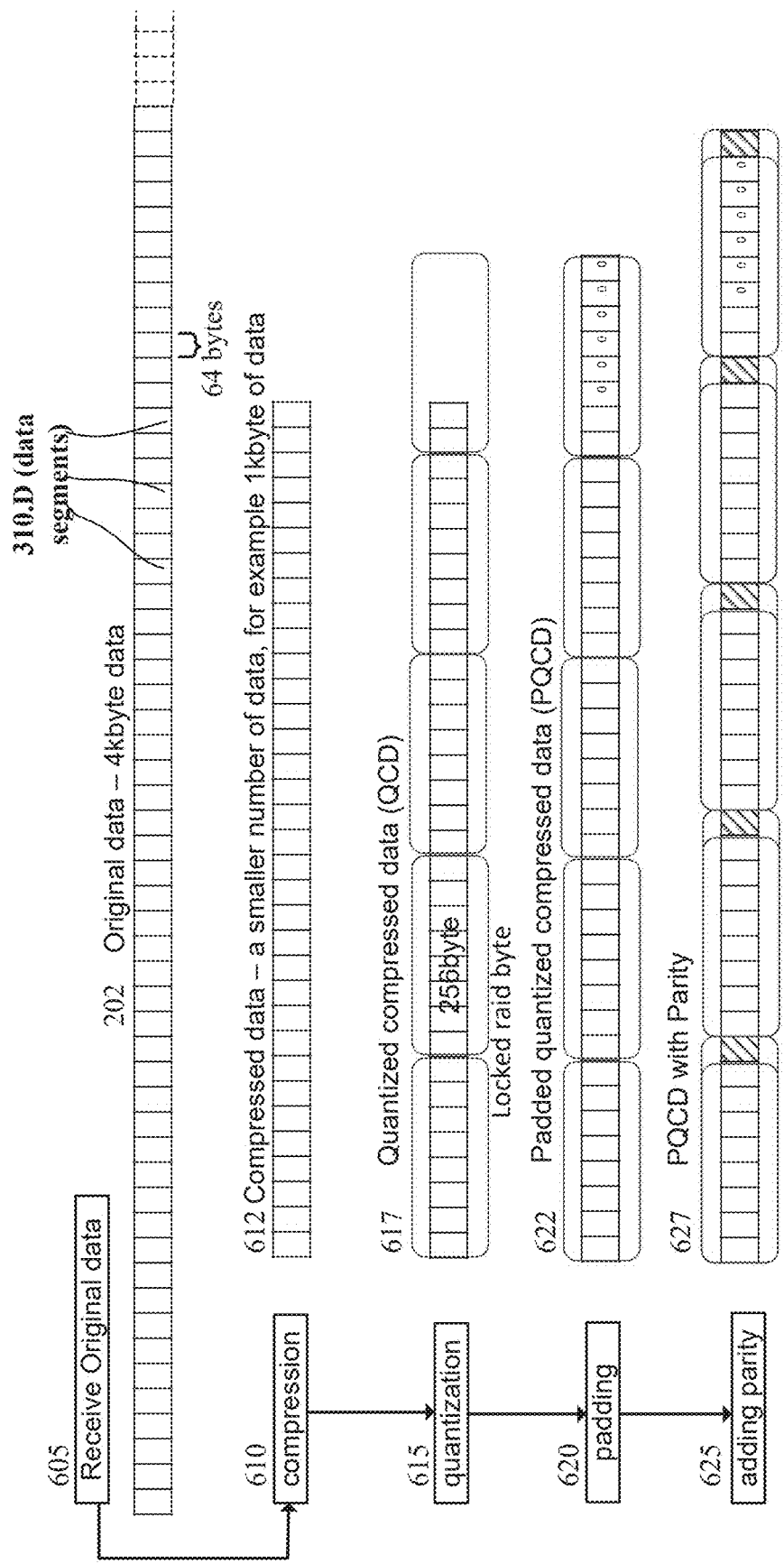
FIG. 6A is a flow chart of an exemplary method for variable length LRAID with multiple parity blocks.

FIG. 6A is a flow chart of an exemplary method 600 for VL LRAID with multiple parity segments 310.P. The method begins with action 605, where original, uncompressed data 202 is received, for example, from the CPU 107 by way of the codec 109, in accordance with VL LRAID protocols.

In action 610, the codec 109 performs compression according to known methods to yield compressed information 612. Compression methods that may be employed may include, for example and without limitation, LZ4, LZMA, or LZO, or similar.

In action 615, the data may be quantized into compressed data units 617 of for example eight data segments 310.D each.

In action 620, any empty data segments 310.D at the end of the quantized compressed data may be padded with zeros to yield padded quantized compressed data (PQCD) 622 and PQCD with parity 627.

In action 625, each PQCD 622 has a RAID parity segment 310.P added.

Figure 6B:
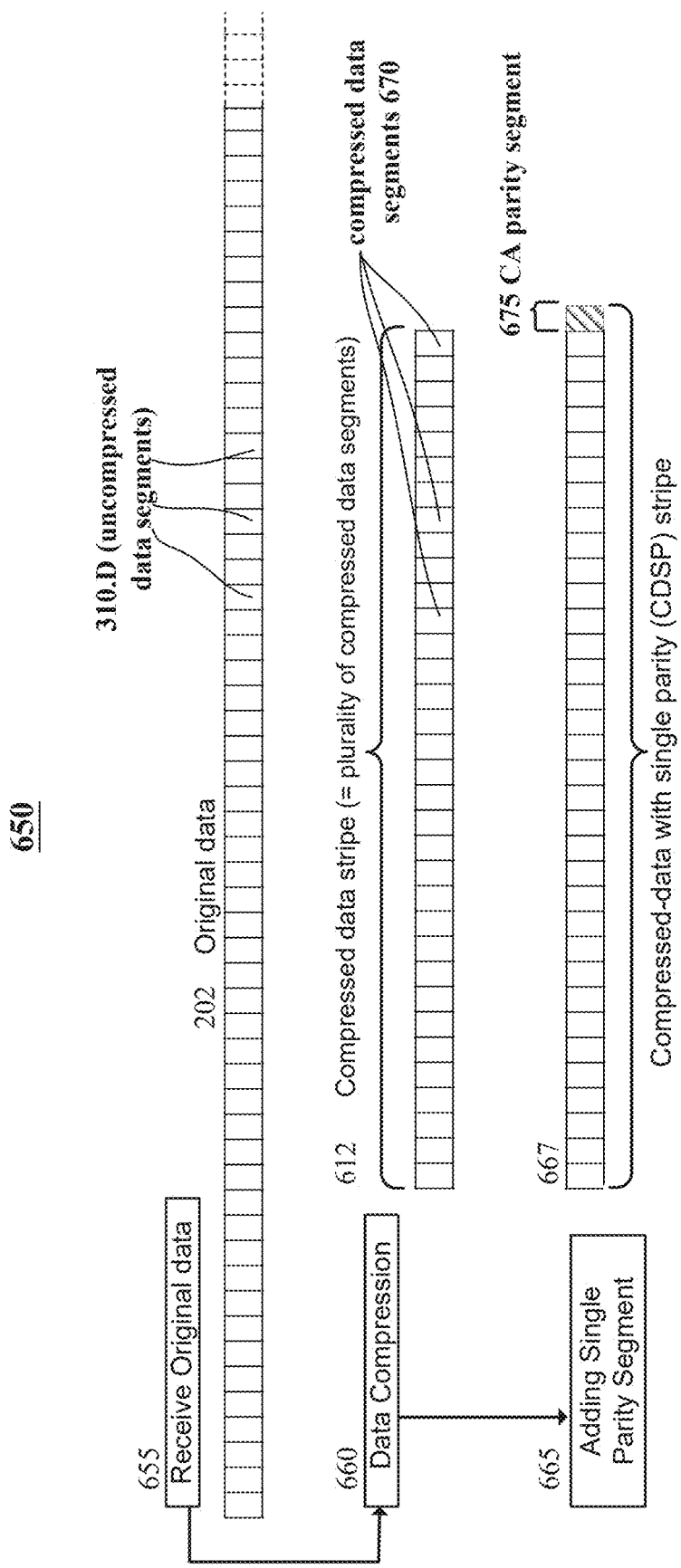
FIG. 6B is a flow chart of an exemplary method for VL LRAID with a single parity block.

FIG. 6B is a flow chart of an exemplary method 650 for variable length RAID with a single parity block. The method begins with an action 655, where original, uncompressed information is received, for example, from the CPU 107 by way of the codec 109, in accordance with the VL LRAID protocols. In action 660, the codec 109 performs compression according to known methods to yield compressed data 612. In action 665, the compressed data 612 has a single RAID parity segment 675 (310.P) added, which provides error correction for the entire stripe 667 of compressed information. The complete stripe may now be known as a CDSP stripe 667, which has compressed data segments 670, and a compression-associated parity (CA) parity segment 675.

However, the method 650 of FIG. 6B introduces a potential problem for the information correction process. When a CRC check is performed and detects a data error in the CDSP stripe 667, it is no longer apparent which compressed-information data segment 670 contains the error and needs correction. Also, it is not apparent which of the remaining compressed data segments 670 do not contain errors, and therefore should be employed in the XOR operation to recover the damaged data.

One solution is to sequentially treat each information block (e.g., each compressed data segment 670) of the CDSP stripe 667 as an errored block. The hypothetically errored compressed data segment 670 is provisionally corrected, and the entire information is then checked against the CRC data. Once a CRC check on a given, provisionally corrected block confirms that the data is now correct, then it becomes known that the given, provisionally corrected block was, in fact, the actually errored compressed data segment 670. The correction process is thereby complete with the correction of that (formerly errored) compressed data segment 670. Provisional corrections on other compressed data segments 670, prior to that point, are not applicable and are ignored. Further blocks need not be checked.

The present solution is different from a pure RAID solution because in the present solution the LRAID CDSP stripe 667 remains locked (differently from the pure RAID solution). In the proposal, the CDSP stripe 667 is accessed (at least virtually) always in parallel. Since embodiments of the present method need all of the information (within a CDSP stripe 667) to perform the decompression, this method accesses all the information of the RAID CDSP stripe 667, checking at each access to assess the correctness of the information with the CRC. That is, the CRC check can be done only after receiving all the information in the memory subsystem (the CXL operations ASIC 230).

As per above, the correction must be executed by checking multiple possible error positions. This operation can take some time to complete because there are thirty-two possible positions (or, at most, 64 possible positions).

In the embodiments, the error checking may be performed in a fully parallel fashion. However, this may require substantial hardware for which there may not be room on the chip. If this is not possible for area/complexity constraints, in another embodiment the method may apply multiple times a multiple-parallel-check operation with a smaller parallelism.

Figure 7:
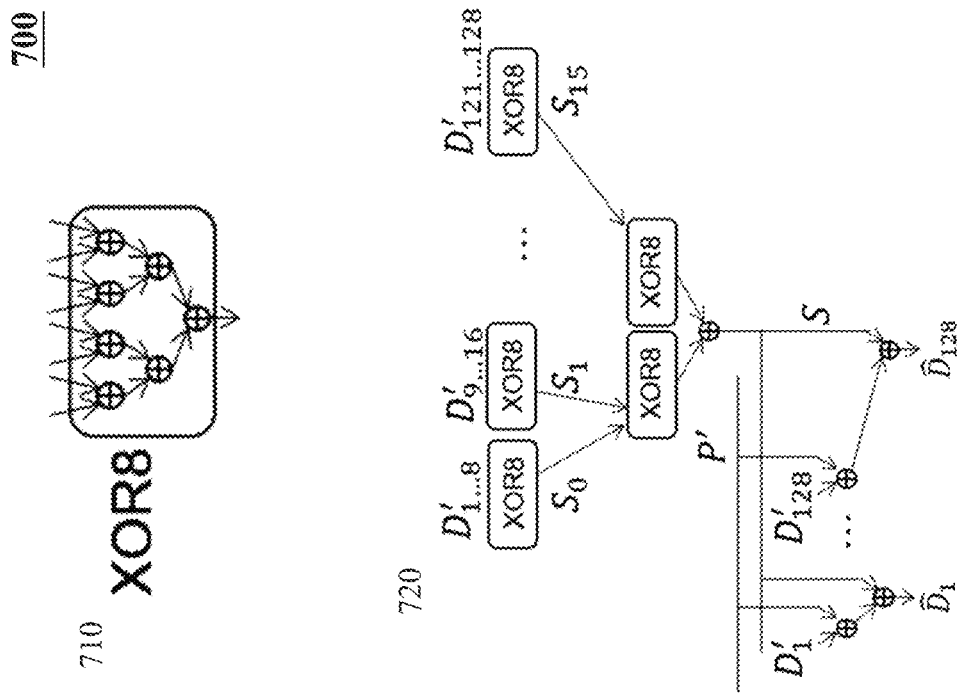
FIG. 7 illustrates a semi-multi-parallel check for memory for VL LRAID.

A semi-multi-parallel check 700 is illustrated in condensed form 710 and expanded form 720 in FIG. 7.

In the semi-multi-parallel check 700, the parity is computed starting from the original data for a die $D_i$, where $\oplus$ is the XOR operator:

$$P = \Sigma_{i=1}^{128} D_i$$

The data $D_i$ could be contaminated by errors thus resulting in $D_i'$ in principle different from $D_i$. For the present method, it is assumed that just for one index j it results $D_j' \neq D_j$, while for the remaining i it is the case that $D'_i = D_i$ for $i \neq j$.

The 32 (or 64) checks to identify the chip providing the incorrect data $D_j' \neq D_j$ consist in computing the 64 CRC checks:

$$CRC_j(D'_j)$$

with $D_j' = \hat{D}_j$, being $$\hat{D}_j = \Sigma_{i \neq j}^{128} D_i' \oplus P' = \Sigma_{i=1}^{128} D_i' \oplus D_j' \oplus P'$$

and comparing them with the original CRC computed from the original data $CRC(D_j)$.

A semi-parallel multi check is performed, where computations can proceed in parallel or in sequence. When the computations occur in sequence, the same calculation engine may be used multiple times.

In an exemplary parallel case with parallelism 8, each engine computes (k=0, ..., 15):

$$S_k = \Sigma_{i=1+k8}^{(8+1)k} D_i'$$

Then all the $S_k$ must be added to obtain $$S = \Sigma_{k=0}^{15} S_k$$

Finally, the local tests can be performed by computing the eight estimated data blocks $$\hat{D}_j = S \oplus D_j' \oplus P'$$

The method then computes the eight CRCs in which to the data $D_j'$ is replaced with $\hat{D}_j$.

When the approach is sequential, that is, the $S_k$ are computed one after the other by using the same calculation engine and the partial results are accumulated in the register S Then a second calculation engine computes the estimates $\hat{D}_j = S \oplus D_j' \oplus P'$.

The two engines are applied sequentially to all the blocks of data.

In an alternative embodiment, the method fixes as a constant the granularity of the CRC check. In such an embodiment, there are a certain specific number of CRC checks, each of which performs a local check with its one parity. Such an embodiment may improve performance since the method does not need to wait for all the blocks to have terminated the computation of $S_k$, which is needed for computing S. Instead, each block can independently compute its CRC and make the multi-testing to determine the error position. The drawback is the cost of having more CRC parity to store.

Figure 8A:
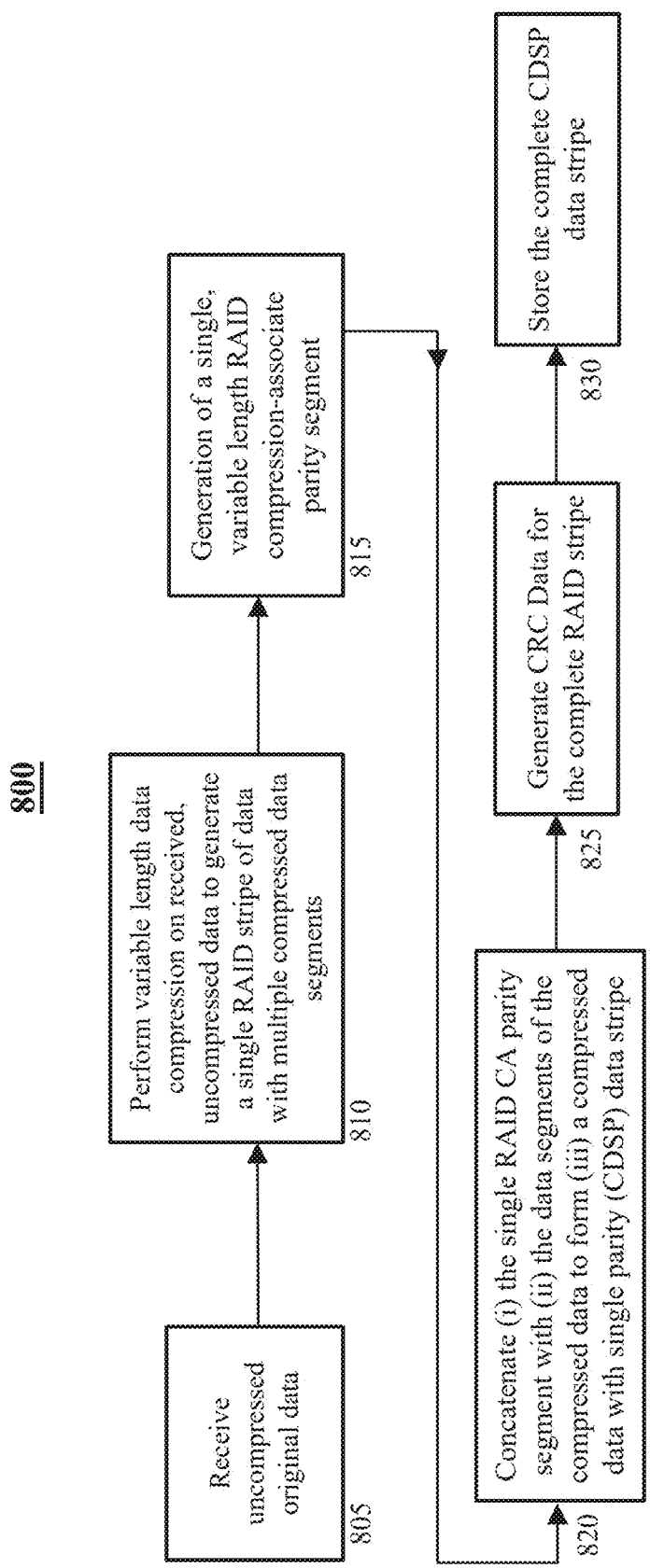
FIG. 8A is a flow chart of an exemplary method for VL LRAID compression.

FIG. 8A is a flow chart of an exemplary method 800 for variable-length LRAID to compress the data stored in memory.

The method 800 begins with action 805 where uncompressed original data 202 is obtained by the CXL operations ASIC 230 from the host CPU 107 or the host device 205.

In action 810, the CXL operations ASIC 230 operatively coupled to the DRAM channel 120, performs variable length information compression on the original, uncompressed data 202 to generate compressed data segments 670. The CRC data and the compressed data segments 670 are stored in a plurality of blocks of a single compressed data stripe 612 (a single stripe) of the LRAID system. As understood in the art, the degree of compression that may be achieved may depend on the specific bit sequence of the uncompressed data from which the compressed data is generated, as well as on the compression algorithm employed. The present method takes advantage of this to generate variable-length data compression.

In action 815, the CXL operations ASIC 230 generates a single RAID CA parity segment 675 suitable for recovery of a failed data segment 670 of the single CDSP stripe 667. The length in bytes of the generated RAID CA parity segment 675 may be variable, where the variable length is contingent on the length of the compressed information. More compressed information will typically have a shorter length CA parity segment 675, as compared to the RAID parity for less compressed information.

In action 820, the control circuitry concatenates the single RAID CA parity segment 675 with the compressed data segments 670 of the compressed data stripe to form the CDSP stripe 667, 550.

In action 825, the control circuitry generates CRC data configured to enable a CRC check of the compressed information stored in the complete data stripe 550, 667.

In one embodiment, the CRC data is added to (stored within) the complete CDSP stripe 667 after the CA parity segment 675 is added.

In action 830, the complete CDSP stripe 667 is stored in the RAID system.

In concise, summary form (and with some details from the above omitted): in action 805 uncompressed, original data 202 is received, and the data is compressed into compressed data segments 670, which are stored together in a compressed data stripe 612, in action 810. A single RAID CA parity segment 675 is generated in action 815, and the compressed data segments 670 and the RAID CA parity segment are concatenated to form the CDSP stripe 667 in action 820. In 825, CRC data is generated for the CDSP stripe 667 and integrated with the stripe 667 and the completed CDSP stripe 667 is stored in action 830.

Figure 8B:
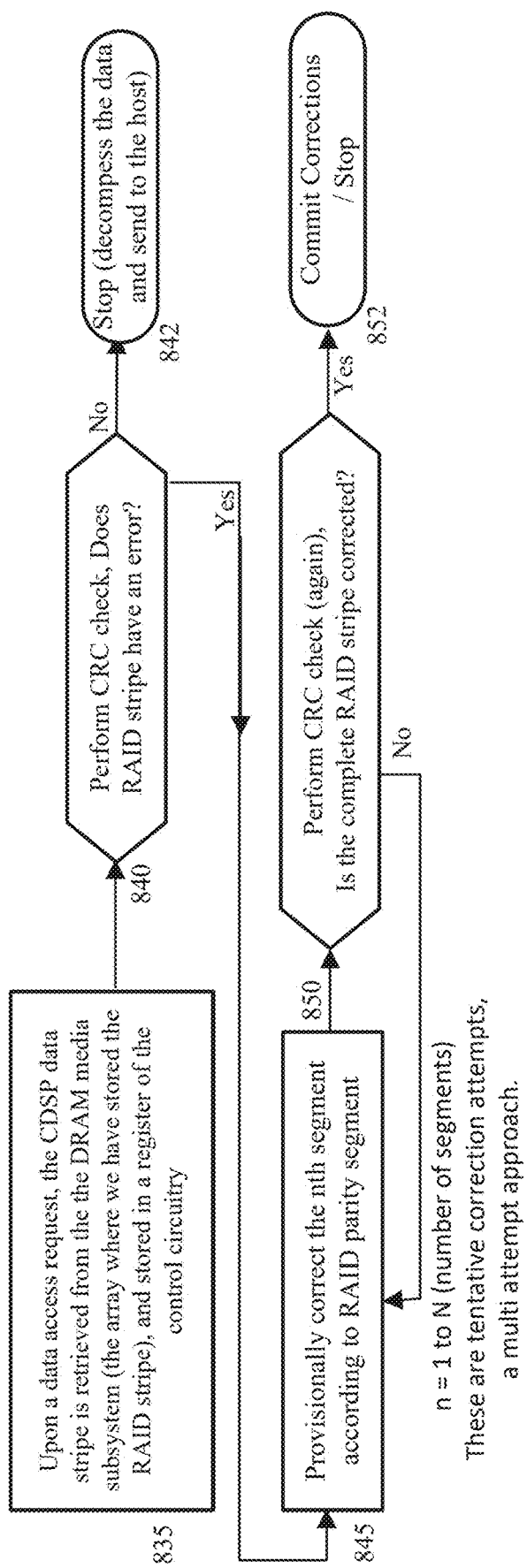
FIG. 8B is a flow chart of an exemplary method for multi-tentative decoding.

FIG. 8B is a flow chart of an exemplary method 832 for variable-length LRAID to decompress the data stored via method 800 of FIG. 8A.

In action 835, upon an access request, the complete CDSP data stripe 667 is retrieved from the RAID and stored in the VL LRAID buffer 405 of the CXL operations ASIC 230, where the information from the RAID array is temporarily locked.

In action 840 a CRC check is performed, via the CXL operations ASIC 230, on the locked complete stripe 550 CDSP data stripe 667. If in action 840 no error is found, the method terminates at action 842. Routine processing on the complete data stripe (to decompress) may continue. If in action 840 a CRC error is found, the method continues with action 845.

In action 845, each compressed data segment 670 of the CDSP stripe 667 is considered as a potentially errored segment by tentatively correcting the errored segment according to the RAID CA parity segment 675. Assuming there are N segments in the CDSP stripe 667, this action may be repeated up to N times, with each segment being separately processed.

In action 850 a determination is made according to the CRC check if the tentatively corrected segment results in a correct complete data stripe or an incorrect complete data stripe. Assuming there are N segments in the stripe, this action may be repeated up to N times.

In action 850, if the CXL operations ASIC 230 determines according to the CRC check that the tentatively corrected segment results in a correct complete data stripe, then in action 852 the complete data stripe is corrected according to the corrected segment. The method then terminates.

In some embodiments, actions 845 and 850 may be performed in parallel on multiple segments, which may require more hardware but results in time efficiency. In alternative embodiments, actions 845 and 850 may be performed in series, on one segment after another, resulting in hardware efficiency but a longer time for the processing.

In an LRAID memory system, the present method generates variable length compressed data in a RAID stripe, which is stored along with the inclusion of a single RAID parity segment for the entire stripe. If any data segment in the RAID CDSP stripe 667 fails, as determined by a CRC check, the data can be recovered by XORing the single RAID CA parity segment 675 with all the compressed data segments 670 in the stripe.

However, to determine which data segment has failed, successive data segments must be XORed, and the CRC check re-performed until the CRC error stands corrected. In an embodiment, the successive data segments may be tested in parallel with suitable hardware. In an embodiment, the successive data segments may be tested sequentially, or semi-in-parallel and semi-sequentially.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The present disclosure may be employed with numerous different memory chip designs, numerous bus designs, numerous addressing systems and varied memory location schemas, both logical and hardwired/physical.

Alternative embodiments, examples, and modifications which would still be encompassed by the disclosure may be made by those skilled in the art, particularly in light of the foregoing teachings. Further, the terminology used to describe the disclosure is intended to be in the nature of words of description, rather than of limitation.

Those skilled in the art will also appreciate that various adaptations and modifications of the preferred and alternative embodiments described above can be configured without departing from the scope of the disclosure. Therefore, it is to be understood that within the scope of the appended claims, the disclosure may be practiced other than as specifically described herein.

For example, various aspects of the present disclosure can be implemented by software, firmware, hardware (including hardware represented by software such as Verilog or hardware description language instructions), or a combination thereof. After reading this description, it will become apparent to a person skilled in the relevant art how to implement the disclosure using other computer systems and/or computer architectures.

It should be noted the simulation, synthesis and/or manufacture of the various embodiments of this disclosure can be accomplished, in part, through the use of computer readable code, including general programming languages (such as C or C++), hardware description languages (HDL) including Verilog HDL, VHDL, Altera HDL (AHDL), or other available programming and/or schematic capture tools (such as circuit capture tools).

This computer readable code may be disposed within or imposed upon any known tangible computer usable/readable storage medium including semiconductor, magnetic disk, optical disk (such as CD-read only memory ROM, DVD-ROM, or the like); and as a computer data signal embodied in a computer usable (e.g., readable) transmission medium (such as a tangible medium including digital, optical, or analog-based medium). As such, the code can be transmitted over communication networks including the Internet and intranets, from one tangible computer readable medium to another. It is understood the functions accomplished, and/or structure provided by the systems and techniques described above, may be represented in a core (such as a graphics processing unit core) that is embodied in program code and may be transformed into hardware as part of the production of integrated circuits.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, is not intended to limit the present disclosure and appended claims in any way.

What is claimed is:

1. A device comprising:
a data interface configured to operatively couple to a redundant array of independent disks (RAID), each RAID comprising a plurality of dynamic random access memory (DRAM) dies; and
control circuitry operatively coupled to the data interface and at least configured to:
obtain an uncompressed data from a host;
perform data compression on the obtained uncompressed data to generate a compressed data, wherein the compressed data is stored in a plurality of compressed data RAID segments of a single RAID compressed data stripe, each RAID segment comprising one data block of a DRAM die;
generate a single RAID compression-associated (CA) parity segment suitable for recovery of any one failed compressed data segment of the single RAID data stripe; and
concatenate the single RAID CA parity segment with the plurality of compressed data segments of the single RAID compressed data stripe to form a compressed data with single parity (CDSP) stripe of the RAID.

2. The device of claim 1, wherein the control circuitry is further configured to generate a single cyclic redundancy check (CRC) data configured to enable a CRC check of the compressed data stored in a complete RAID CDSP data stripe.

3. The device of claim 2, wherein the control circuitry is further configured to perform a series correction process or a parallel correction process, wherein the control circuitry:
separately process each individual compressed data segment of a complete RAID CDSP data stripe as a potentially errored segment by tentatively correcting the potentially errored segment according to the RAID parity segment yielding a tentatively corrected segment; and
determine according to the CRC check if the tentatively corrected segment results in a correct complete CDSP data stripe or an incorrect complete CDSP data stripe.

4. The device of claim 3, wherein the control circuitry is further configured to determine according to the CRC check that the tentatively corrected segment results in a correct complete CDSP data stripe; and
correct the CDSP data stripe according to a corrected segment.

5. The device of claim 3, wherein the control circuitry is further configured to correct each potentially errored segment in parallel.

6. The device of claim 3, wherein the control circuitry is further configured to correct each potentially errored segment in series.

7. The device of claim 3, wherein the control circuitry is further configured to terminate the series correction process upon determining that a last corrected segment corrects the CDSP data stripe.

8. The device of claim 1, wherein the control circuitry is further configured to perform a variable length data compression, wherein the RAID is a variable length RAID.

9. The device of claim 8, wherein a length of a CA parity segment generated by the control circuitry is variable, the variability being contingent on a length of the compressed data.

10. The device of claim 1, wherein the compressed data is stored, in a controller, during a CRC check, wherein the RAID is a locked RAID.

11. A method comprising:
obtaining, at a data interface configured to operatively couple to a redundant array of independent disks (RAID), each RAID comprising a plurality of dynamic random access memory (DRAM) dies, an uncompressed digital data from a host; and
performing, via control circuitry operatively coupled to the data interface, data compression on the obtained data to generate compressed data, wherein the compressed data is stored in a plurality of RAID data segments of a single compressed data stripe of the RAID, each RAID segment comprising one data block of a DRAM die;
generate a single RAID compression-associated (CA) parity segment suitable for recovery of any one failed data segment of the single compressed data stripe; and
concatenate the single RAID CA parity segment with the data segments of the compressed data stripe to form a compressed-data-with-single-parity (CDSP) data stripe.

12. The method of claim 11, further comprising generating via the control circuitry a single cyclic redundancy check (CRC) data configured to enable a CRC check of the compressed data stored in the CDSP data stripe.

13. The method of claim 12, further comprising:
separately processing, via the control circuitry, each individual data segment of a complete CDSP data stripe as a potentially errored segment by tentatively correcting the errored segment according to a RAID CA parity segment; and
determining according to the CRC check if the tentatively corrected data segment results in a correct complete CDSP data stripe or an incorrect complete CDSP data stripe.

14. The method of claim 13, further comprising:
determining, via the control circuitry, according to the CRC check that the tentatively corrected segment results in a correct complete CDSP data stripe; and
correcting a complete CDSP data stripe according to a corrected segment.

15. The method of claim 13, further comprising correcting via the control circuitry each potentially errored segment in parallel.

16. The method of claim 13, further comprising correcting via the control circuitry each potentially errored segment in series.

17. The method of claim 13, further comprising terminating via the control circuitry a series correction process upon determining that a most recently corrected segment corrects a complete CDSP data stripe.

18. The method of claim 11, further comprising performing a variable length data compression, wherein the RAID is a variable length RAID.

19. The method of claim 18, further comprising:
generating via the control circuitry a variable length RAID CA parity segment, wherein a variable length of the RAID CA parity segment is contingent on a length of the compressed data; and
storing the compressed data in a controller, during a CRC check, wherein the RAID is a locked RAID.

* * * * *